(12) United States Patent
Sauter et al.

(10) Patent No.: US 11,668,421 B2
(45) Date of Patent: Jun. 6, 2023

(54) CLAMPING NUT FOR A HOSE CONNECTOR

(71) Applicant: Husqvarna AB, Huskvarna (SE)

(72) Inventors: Thomas Sauter, Laichingen (DE); Benedikt Gross, Adelmannsfelden (DE)

(73) Assignee: HUSQVARNA AB, Huskvarna (SE)

(*) Notice: Subject to any disclaimer, the term of this patent is extended or adjusted under 35 U.S.C. 154(b) by 153 days.

(21) Appl. No.: 16/982,127

(22) PCT Filed: Sep. 25, 2018

(86) PCT No.: PCT/EP2018/075916
§ 371 (c)(1),
(2) Date: Sep. 18, 2020

(87) PCT Pub. No.: WO2019/179641
PCT Pub. Date: Sep. 26, 2019

(65) Prior Publication Data
US 2021/0095800 A1    Apr. 1, 2021

(30) Foreign Application Priority Data
Mar. 19, 2018   (DE) .................... 10 2018 002 196.4

(51) Int. Cl.
*F16L 33/22*   (2006.01)
(52) U.S. Cl.
CPC .................. *F16L 33/224* (2013.01)
(58) Field of Classification Search
CPC .................................................. F16L 33/224
(Continued)

(56) References Cited

U.S. PATENT DOCUMENTS 1,844,023 A * 2/1932 Terry .................... F16L 33/222
                                                      285/259
3,675,951 A * 7/1972 Morin .................... F16L 33/01
                                                      285/39
(Continued)

FOREIGN PATENT DOCUMENTS

| AT | 338576 B | 9/1977 |
| CH | 456270 A | 5/1968 |

(Continued)

OTHER PUBLICATIONS

International Search Report and Written Opinion for International Application No. PCT/EP2018/075916 dated Jan. 4, 2019.

(Continued)

*Primary Examiner* — James M Hewitt, II
(74) *Attorney, Agent, or Firm* — Burr & Forman, LLP

(57) ABSTRACT

A clamping nut (100) for a hose connector (200) includes a first angular surface (302) and a second angular surface (304) defined on an inner surface (122) of a nut body (110) towards the first end (112) and the second end (114) of the nut body (110). The first angular surface (302) and the second angular surface (304) are provided at a first angle (α) and a second angle (β) with a central axis (A-A') of the nut body (110). A contact section (306) is defined on the inner surface (122) of the nut body (110) between the first angular surface (302) and the second angular surface (304). The contact section (306) is adapted to contact a hose (120) when the clamping nut (100) is threadedly coupled to the hose connector (200). Further, inner diameter (d) of the inner surface (122) of the clamping nut (100) across the contact section (306) is substantially identical to an outer diameter (D) of the hose (120), and the first angle (α) has a value in a range of about 90 to 120 degrees.

4 Claims, 3 Drawing Sheets

(58) Field of Classification Search
USPC .......................................................... 285/243
See application file for complete search history.

(56) References Cited

U.S. PATENT DOCUMENTS

| | | | |
|---|---|---|---|
| 4,063,760 A | 12/1977 | Moreiras | |
| 5,072,072 A * | 12/1991 | Bawa | H02G 3/0691 |
| | | | 285/151.1 |
| 5,131,691 A | 7/1992 | Washizu | |
| 5,558,375 A | 9/1996 | Newman | |
| 6,196,596 B1 | 3/2001 | Kwok et al. | |
| 8,499,799 B2 | 8/2013 | Saltel et al. | |
| 2011/0163530 A1* | 7/2011 | Shih | F16L 33/224 |
| | | | 285/24 |

FOREIGN PATENT DOCUMENTS

| | | | | |
|---|---|---|---|---|
| CH | 688241 | A5 | 6/1997 | |
| CN | 103398245 | A | 11/2013 | |
| CN | 203718189 | U | 7/2014 | |
| CN | 105090648 | A | 11/2015 | |
| CN | 106062456 | A | 10/2016 | |
| CN | 106641529 | A | 5/2017 | |
| DE | 3933115 | C2 | 3/1992 | |
| DE | 19654435 | A1 | 7/1998 | |
| DE | 102005011958 | B3 * | 6/2006 | ............ F16L 33/224 |
| DE | 102015120376 | B4 | 10/2017 | |
| EP | 875711 | A1 | 11/1998 | |
| EP | 1867906 | B1 | 8/2009 | |
| EP | 1859189 | B1 | 11/2012 | |
| FR | 2640720 | B1 | 9/1991 | |
| GB | 721672 | A | 1/1955 | |
| GB | 2121133 | A * | 12/1983 | ............ F16L 33/224 |
| JP | 2968775 | B2 | 11/1999 | |
| WO | 2015029815 | A1 | 3/2015 | |
| WO | WO-2015131932 | A1 * | 9/2015 | ............ F16L 25/009 |

OTHER PUBLICATIONS

International Preliminary Report on Patentability for International Application No. PCT/EP2018/075916 dated Jun. 19, 2020.

* cited by examiner

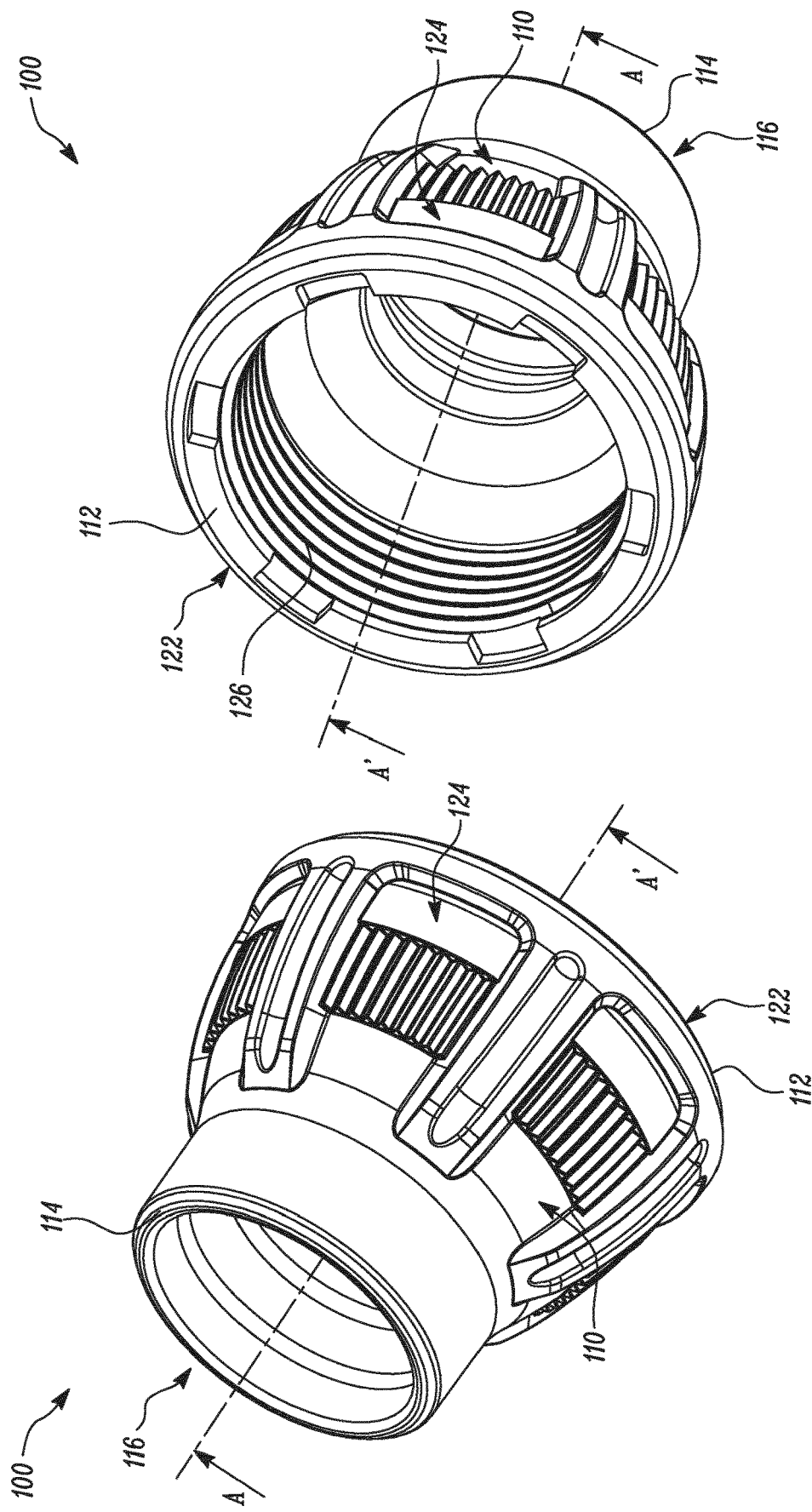

CLAMPING NUT FOR A HOSE CONNECTOR

TECHNICAL FIELD

The present disclosure relates to a watering equipment. More particularly, the present disclosure pertains to a convenient and user-friendly clamping nut which allows self-locking with a hose of the watering equipment.

BACKGROUND

Watering equipment includes hoses, hose connectors, spray guns, taps or spigots for application of water from the taps or spigots to garden or any other target area. Depending upon parameters such as garden area, geography and the like there may be requirement of multiple taps and corresponding hose connectors and other tools of the watering equipment. But, application of multiple hose connectors can become cumbersome due to inadequate connection in case of some hoses.

Further, there have been concerns regarding unsuitable fitting or, at times, self-loosening of the hoses from respective hose connectors. There have been various attempts to address foretold problems but there is still need of a user-friendly and simple means to cater to the requirements. In particular, there are constraints for applications of the hoses made of material such as textile, PVC and the like which may be susceptible to self-loosening in absence of any means to check adequate contact with any part of the watering equipment say a clamping nut.

One such watering equipment is disclosed by WO 2015, 131,932 (hereinafter referred to as '932 reference). The '932 reference provides a screw nut for quick hose coupling. The screw nut is disposed proximate to the hose coupling portion to selectively facilitate engagement of the hose coupling portion with a hose inserted at the hose coupling portion. During engagement, a clamping force is exerted on the hose responsive to tightening of the screw nut. However, the '932 reference comes short of providing self-clamping of the screw nut with the hose particularly for hoses made of the materials such as textile, PVC and the like.

Hence, there is a need for an improved clamping nut which may find application with different hoses and hose connectors, preferably with a self-locking action of the hoses.

SUMMARY

In view of the above, it is an objective of the present invention to solve or at least reduce the drawbacks discussed above. The objective is at least partially achieved by a clamping nut for a hose connector. The clamping nut includes a nut body having a first end and a second end. The nut body defines a hollow space between the first end and the second end to allow a hose to pass from there. The nut body defines an inner surface and an outer surface. The clamping nut includes an inner thread section defined on the inner surface of the nut body towards the first end. The inner thread section engages an outer thread section defined by a body portion of the hose connector to allow a threaded connection of the clamping nut and the hose connector. The body portion of the hose connector further includes an engagement portion to allow the hose to be pushed on. The body portion of the hose connector further includes a plurality of clamping elements disposed circumferentially on the body portion of the hose connector. When the hose is pushed on to the engagement portion, and the inner thread section engages the outer thread section, the clamping nut acts on the plurality of clamping elements to clamp the hose.

The clamping nut includes a first angular surface defined on the inner surface of the nut body towards the first end of the nut body. The first angular surface is provided at a first angle with a central axis of the nut body. The clamping nut further includes a second angular surface defined on the inner surface of the nut body towards the second end of the nut body. The second angular surface is provided at a second angle with the central axis of the nut body. The clamping nut is characterized in that a contact section is defined on the inner surface of the nut body between the first angular surface and the second angular surface. The contact section contacts the hose when the clamping nut is threadedly coupled to the hose connector. Further, inner diameter of the inner surface of the clamping nut across the contact section is substantially identical to an outer diameter of the hose, and the first angle has a value in a range of about 90 to 120 degrees. Thus, the present disclosure provides a simple, convenient and user-friendly clamping of the hose on account of self-locking of the hose without resorting to any external force.

According to an embodiment of the present invention, the first angle can have a value in a range of about 90 to 110 degrees or even about 90 to 100 degrees. Range of the first angle will usually depend upon multiple factors such as the hose (type, material, size and the like), the nut, among others.

According to an embodiment of the present invention, the second angle has a value in a range of about 5 to 30 degrees. Primary role of the second angle is to allow unhindered assembly of the hose with the clamping nut. Moreover, range of the second angle will usually depend upon multiple factors such as the first angle, the hose (type, material, size and the like), the nut, among others.

According to an embodiment of the present invention, the engagement portion is substantially conical shaped. This shape leads to ease of assembly or disassembly of the hose with the engagement portion of the clamping nut. In particular the conical shape of the engagement portion does allow for proper engagement of hoses of a variety of inner diameters to properly engage with the hose connector, as any inner diameter of the hose will fit to a corresponding outer diameter of the engagement portion.

Other features and aspects of this invention will be apparent from the following description and the accompanying drawings.

BRIEF DESCRIPTION OF THE DRAWINGS

The invention will be described in more detail with reference to the enclosed drawings, wherein:

FIGS. 1A and 1B show perspective views from top and bottom, respectively, of a clamping nut, in accordance with an embodiment of the present invention;

DESCRIPTION OF EMBODIMENTS

Figure 2B:
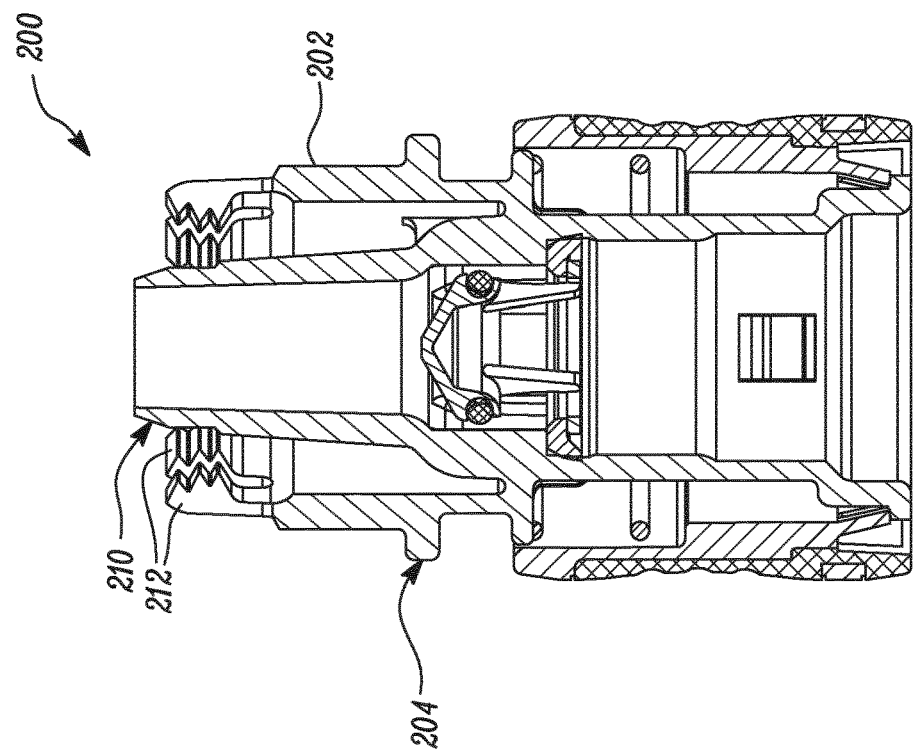
FIGS. 2A and 2B show a front view and a front cross-sectional view, respectively, of a hose connector, in accordance with an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of structures. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIGS. 1A and 1B show perspective views of a clamping nut 100. The clamping nut 100 includes a nut body 110 having a first end 112 and a second end 114. The nut body 110 defines a hollow space 116 between the first end 112 and the second end 114 to allow a hose 120 (not illustrated here) to pass. The nut body 110 defines an inner surface 122 and an outer surface 124. The clamping nut 100 includes an inner thread section 126 defined on the inner surface 122 of the nut body 110 towards the first end 112. Further, the inner thread section 126 engages an outer thread section 202 defined by a body portion 204 of a hose connector 200 (shown in FIGS. 2A, 2B and 3) to allow a threaded connection of the clamping nut 100 and the hose connector 200.

The present disclosure illustrates application of the clamping nut 100 with the hose connector 200 although the present disclosure may be readily used with any watering or gardening equipment such as water controller, water pump etc. Moreover, the present disclosure may be used with any other equipment which generally involves clamping of a hose or tube with a clamping means, resembling the clamping nut 100 of the present disclosure as will be appreciated by a person having ordinary knowledge in the art.

Figure 2A:
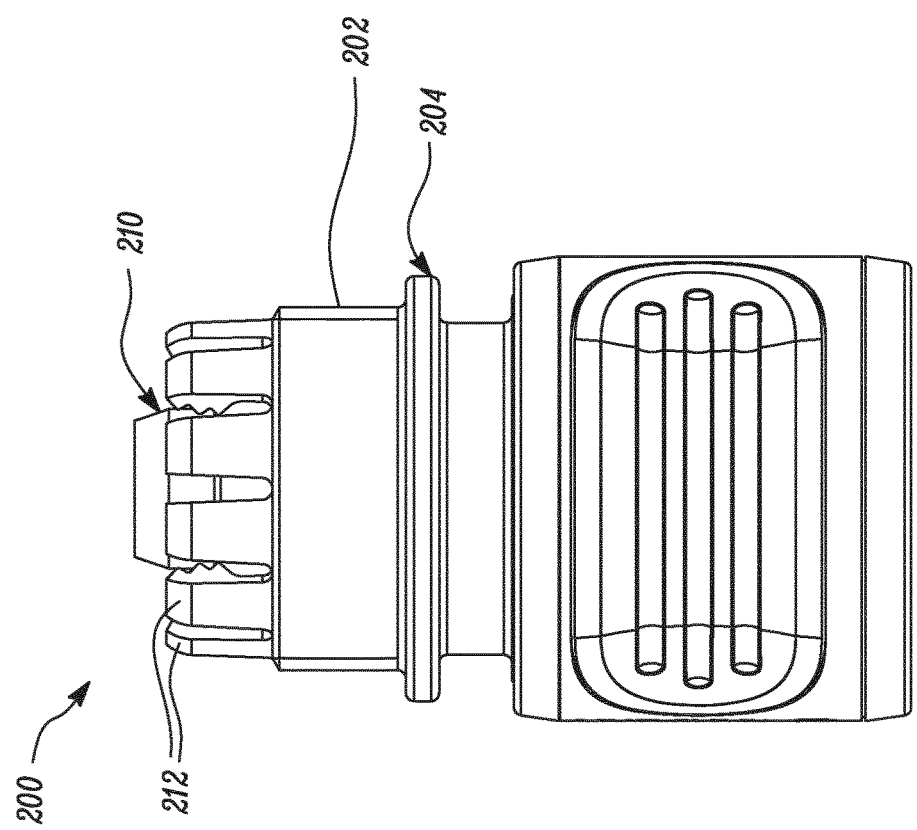

FIGS. 2A and 2B show a front view and a front cross-sectional view, respectively, of the hose connector 200. The body portion 204 of the hose connector 200 further includes an engagement portion 210 to allow the hose 120 to be pushed on. The engagement portion 210, as illustrated by the present disclosure, is substantially conical shaped (or tapered profiled) to agree to the dimensions of the hose 120 as would be appreciated by a person having knowledge in the art. Further, other shapes and profiles of the engagement portion 210 have been contemplated and are well within the scope of the present disclosure. Preference for the engagement portion 210 (as illustrated being substantially conical shaped) is to allow suitability and assembly with the hoses 120 of different type, dimensions (i.e. diameter, thickness and the like). The body portion 204 of the hose connector 200 further includes a plurality of clamping elements 212 disposed circumferentially on the body portion 204 of the hose connector 200. When the hose 120 is pushed on to the engagement portion 210, and the inner thread section 126 engages the outer thread section 202, the clamping nut 100 acts on the plurality of clamping elements 212 to clamp the hose 120.

In a preferred embodiment, the hose 120 is made of a material such as textile, PVC or any other flexible material as evident to a person having ordinary knowledge in the art. Preferably, the present disclosure will be even more applicable for a hose with a textile layer over PVC or any other core layer, where the textile layer tends to be pushed over the PVC (i.e. core layer). Such material, in accordance with aspects of the present disclosure, allow "self-lock" on account of the build-up (prominently for textile hoses) of the hose 120 which clamps with internal geometry of the clamping nut 100. This "self-lock" feature ensures adequate clamping of the hose 120 with the clamping nut 100 as elaborated later.

Figure 3:
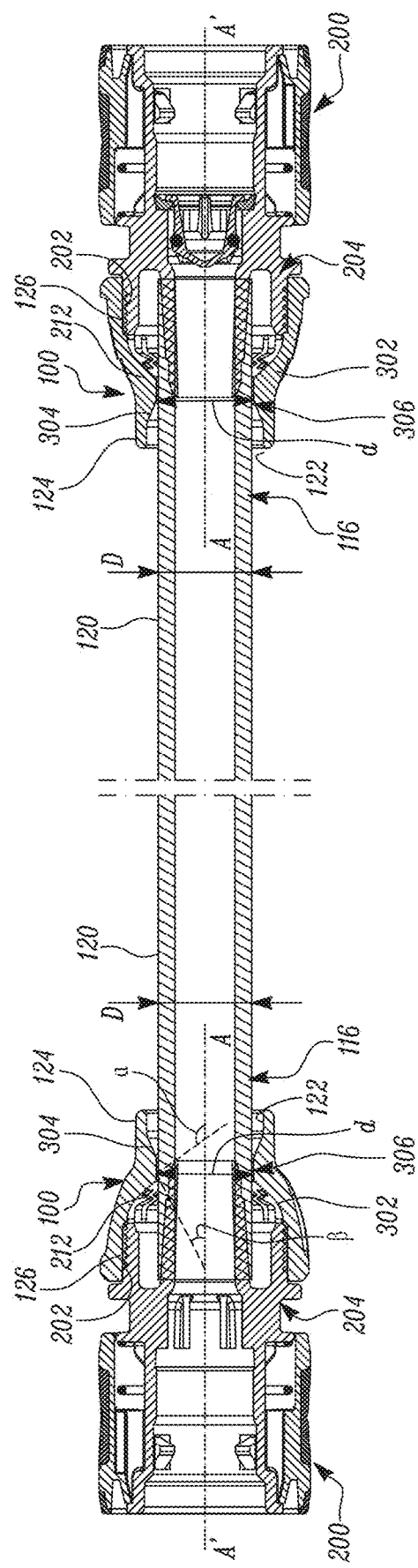
FIG. 3 shows a front cross-sectional view of two sets of the clamping nut coupled with the corresponding hose connector, in accordance with an embodiment of the present invention.

FIG. 3 shows a front cross-sectional view of two sets of the clamping nut 100 with each coupled with the corresponding hose connector 200. Making reference to one of the two sets, the clamping nut 100 includes a first angular surface 302 defined on the inner surface 122 of the nut body 110 towards the first end 112 of the nut body 110. The first angular surface 302 is provided at a first angle α with respect to a central axis A-A' of the nut body 110. The clamping nut 100 includes a second angular surface 304 defined on the inner surface 122 of the nut body 110 towards the second end 114 of the nut body 110. The second angular surface 304 is provided at a second angle β with respect to the central axis A-A' of the nut body 110. The clamping nut 100 further includes a contact section 306 which is defined on the inner surface 122 of the nut body 110 between the first angular surface 302 and the second angular surface 304. The present disclosure illustrates a single set of the first angular surface 302 and the second angular surface 304 although there may be multiple sets of these depending upon the type of application. The contact section 306 contacts the hose 120 when the clamping nut 100 is threadedly coupled to the hose connector 200. Further, inner diameter d of the inner surface 122 of the clamping nut 100 across the contact section 306 is substantially identical to an outer diameter D of the hose 120. In other words, a structural profile of the inner surface 122 of the clamping nut 100 is substantially similar to a structural profile of the outer surface of the hose 120. This allows a compact fit between the clamping nut 100 and the hose 120.

Moreover, the first angle α of the first angular surface 302 can have a value in a range of about 90 to 120 degrees. The range of the first angle α shall be decided to ensure a sufficient build-up of the hose 120 (of textile or like outer layer) allowing the hose 120 to "self-lock" with the contact section 306 of the clamping nut 100.

As used herein, the present disclosure defines "contact section", "first angular surface", and "second angular surface" as together constituting an internal geometry of the clamping nut 100 which engages with outer diameter D of the hose 120. Such internal geometry shall be angled or shaped such that there is sufficient engagement between the internal geometry and the build-up of the hose 120. As evident, different types of hose 120 may need a different profile of the internal geometry to ensure a rigid assembly of the hose 120 with the clamping nut 100 as well as the hose connector 200. In some applications, there may be a provision to customize or change the internal geometry of the clamping nut 100, as preferred by a person having ordinary knowledge in the art, to suit different types of the hose 120. Alternatively, there may be a provision to simply replace or change the clamping nut 100 while continuing application of the hose 120 and the hose connector 200.

In an implementation, there may be multiple instances of locking during assembly of the hose 120 with the hose connector 200 and the clamping nut 100. Initially, the hose 120 is pushed on to the engagement portion 210 such that there is sufficient contact of the hose 120 with the engagement portion 210 of the hose connector 200. Then, the clamping nut 100 is threadedly coupled with the hose connector 200 as explained earlier. After clamping, inner surface 122 of the clamping nut 100, particularly defined by the first angle α of the first angular surface 302 engages with the build-up of the hose 120 to ensure the "self-lock" feature as defined by the present disclosure. In some cases, there can be an external force on the hose 120 to allow proper engagement of the build-up of the hose 120 with the inner surface 122 or the contact section 306 of the clamping nut 100, as elaborated below.

The hose 120, in accordance with an implementation of the present disclosure, has the textile layer on outside and the PVC as the core layer (inside). Initially, during assembly of the clamping nut 100 over the hose 120, tightening of the clamping nut 100 over the hose connector 200 leads to engagement of inner thread section 126 with the outer thread section 202, respectively. While the contact section 306 is in contact with the hose's outer textile layer with its the first angle α formed quite aggressively will result in many cases in an engage with the textile of the hose. Thus that the hose is even further pushed onto the engagement portion during the camp nut being threaded onto the hose connector.

Additionally, or alternatively, on application of the external force on an end (away from the clamping nut 100) of the hose 120, the core layer of the hose 100 does not suffer appreciable change in shape and follows at least partly in the direction of the pulling forces, however, the textile layer that engages with the camp nut in the vicinity of the contact surface 306 is the build-up so that the clamping elements 212 of the hose connector 200 hold the hose even firmer. This build-up locks with the first angular surface 302 of the clamping nut 100. Thus, the present disclosure provides multiple arrangements and options for the "self-lock" of the hose 120.

In some embodiments, the first angle α can have a value in a range of about 90 to 110 degrees or even about 90 to 100 degrees. Range of the first angle α will usually depend upon multiple factors such as the hose 120 (type, material, size and the like), the clamping nut 100, among others. As will be appreciated by a person having knowledge in the art, the value of the first angle α will decide its aggressiveness, the most aggressive being 90 degrees. More aggressiveness of the first angle α will lead to a better grip and connection of the hose 120 between the clamping nut 100 and the hose connector 200, and thus help in "self-lock" of the hose 120. Further, the second angle β may have a value in a range of about 5 to 30 degrees or any other value which allows ease of assembly of the hose 120 in accordance with an application of the present disclosure.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Clamping Nut
110 Nut Body
112 First End
114 Second End
120 Hose
122 Inner Surface
124 Outer Surface
126 Inner Thread Section
200 Hose Connector
202 Outer Thread Section
204 Body Portion
210 Engagement Portion
212 Clamping Elements
302 First Angular Surface
304 Second Angular Surface
306 Contact Section
A-A' Central Axis
α First Angle
β Second Angle
d Inner Diameter
D Outer Diameter

The invention claimed is:

1. A hose connector having a hose inserted therein, wherein the hose connector has a clamping nut, the clamping nut comprising:
 a nut body having a first end and a second end, such that the nut body defines a hollow space between the first end and the second end to allow a hose to pass therefrom, wherein the nut body defines an inner surface and an outer surface;
 an inner thread section defined on the inner surface of the nut body towards the first end such that the inner thread section is adapted to engage an outer thread section defined by a body portion of the hose connector to allow a threaded connection of the clamping nut and the hose connector, wherein the body portion of the hose connector further includes:
 an engagement portion adapted to allow the hose to be pushed on; and
 a plurality of clamping elements disposed circumferentially on the body portion of the hose connector such that when the hose is pushed on to the engagement portion, and the inner thread section engages the outer thread section, the clamping nut acts on the plurality of clamping elements to clamp the hose;
 a first angular surface defined on the inner surface of the nut body towards the first end of the nut body, wherein the first angular surface is provided at a first angle with a central axis of the nut body, wherein the first angle has a value in a range of about 90 to 120 degrees;
 a second angular surface defined on the inner surface of the nut body towards the second end of the nut body, wherein the second angular surface is provided at a second angle with the central axis of the nut body, wherein the second angle has a value in the range of about 5 to 30 degrees;
 wherein a contact section is defined on the inner surface of the nut body between the first angular surface and the second angular surface, wherein the contact section is adapted to contact the hose away from the second end of the nut body, such that the second end of the nut body extends around the hose, beyond the second angular surface, and away from the first end when the clamping nut is threadedly coupled to the hose connector,
 wherein an inner diameter of the inner surface of the clamping nut across the contact section is substantially identical to an outer diameter of the hose when inserted into the hose connector, and wherein the inner diameter of the inner surface of the clamping nut across the contact section is less than an inner diameter of the inner surface of the clamping nut at the second end of the nut body.

2. The hose connector of claim 1, wherein the first angle has a value in a range of about 90 to 110 degrees.

3. The hose connector of claim 1, wherein the first angle has a value in a range of about 90 to 100 degrees.

4. The hose connector of claim 1, wherein the engagement portion is substantially conical shaped.

* * * * *